May 19, 1953    L. R. ERWIN ET AL    2,638,751
WATER COOLER

Filed April 17, 1950    5 Sheets-Sheet 2

LEE ROY ERWIN &
JOSEPH B. GRIFFITH,
INVENTORS.
HUEBNER, BEEHLER, WORREL,
HERZIG & CALDWELL,
                    ATTORNEYS.
BY

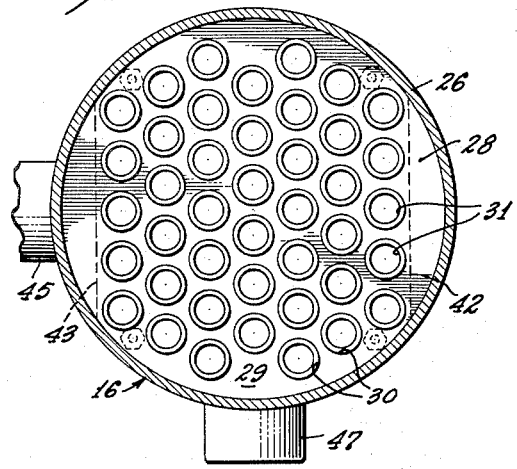
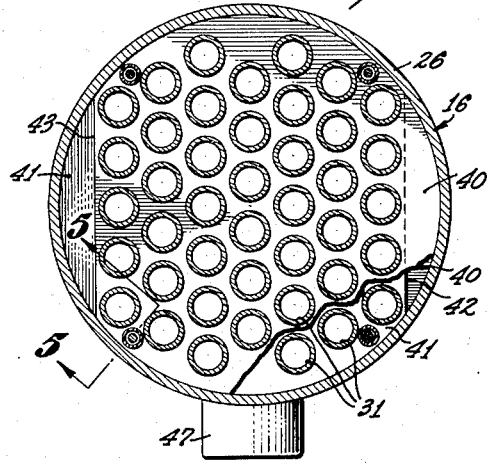
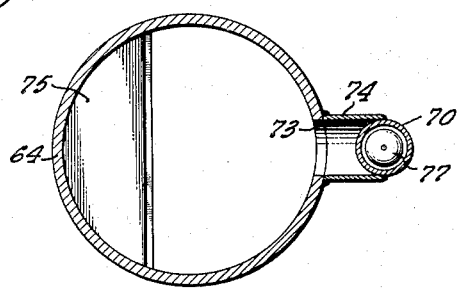
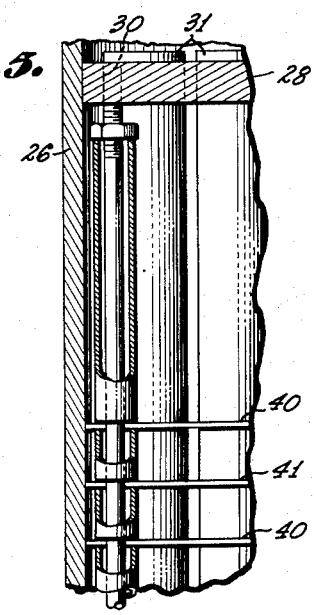
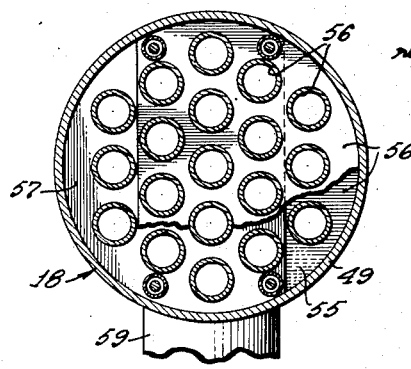

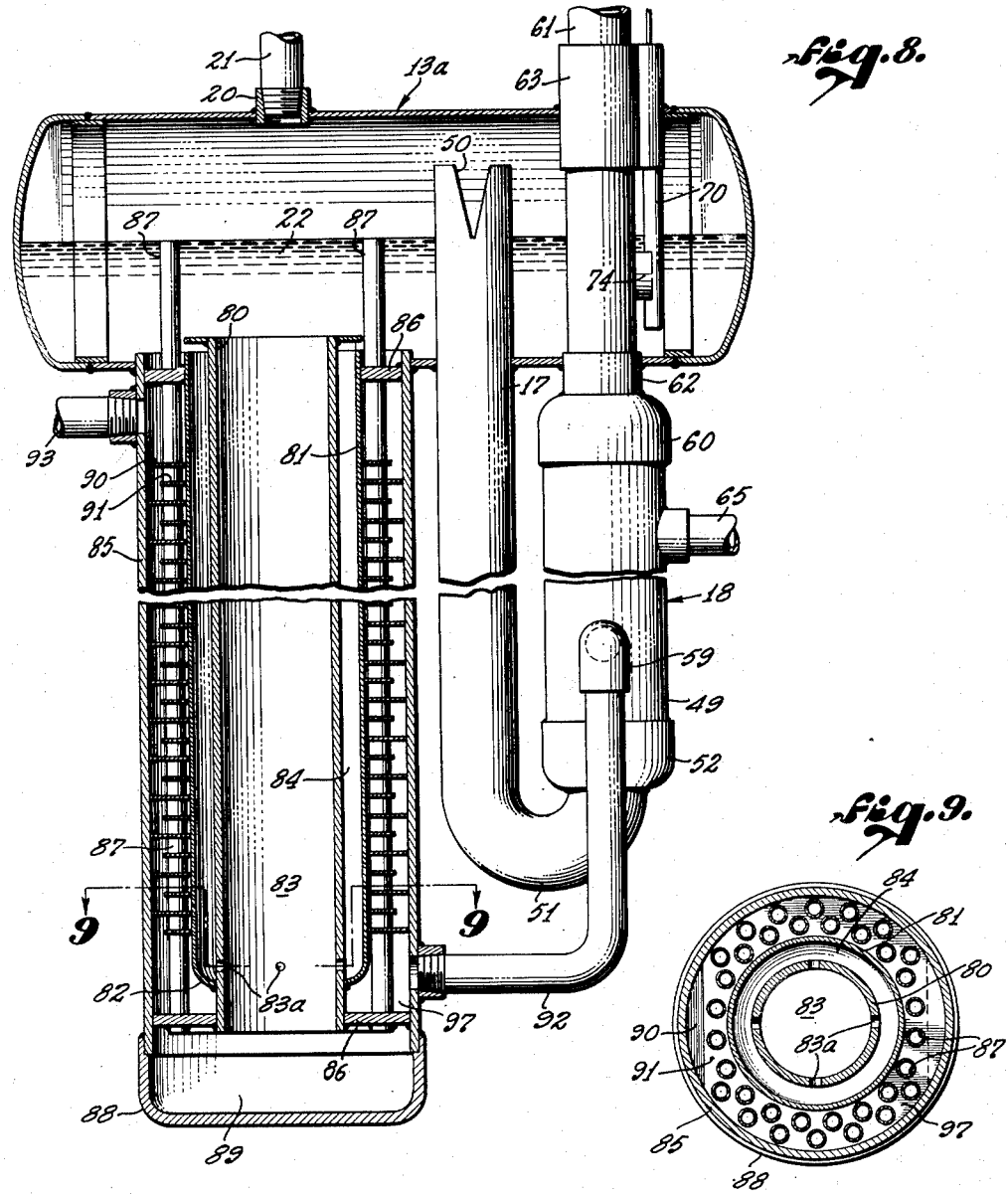

May 19, 1953  L. R. ERWIN ET AL  2,638,751
WATER COOLER
Filed April 17, 1950  5 Sheets-Sheet 5
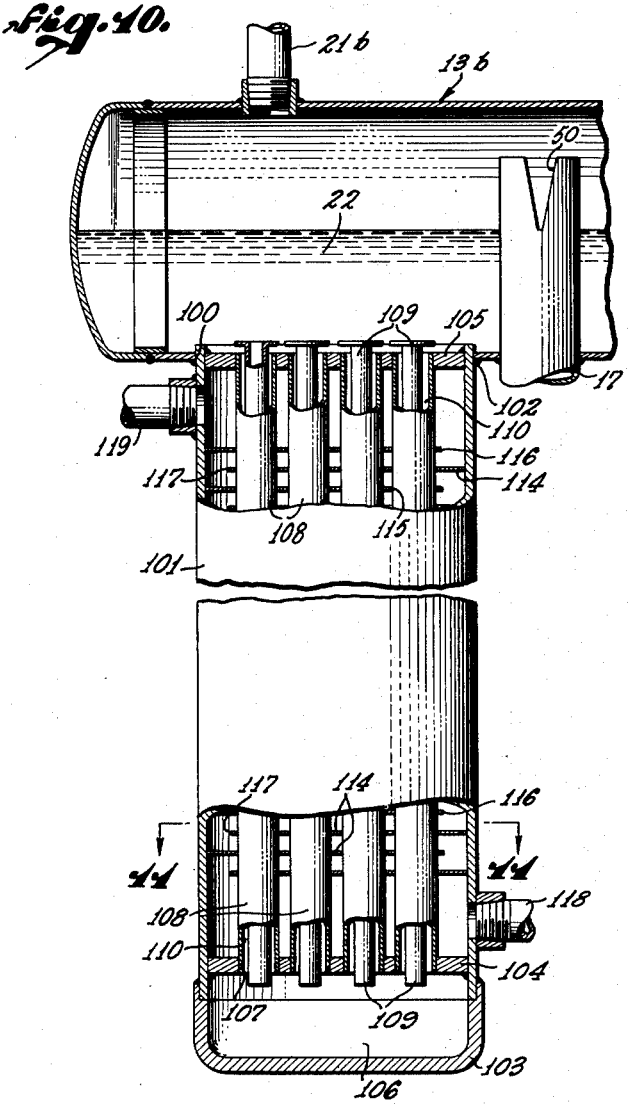
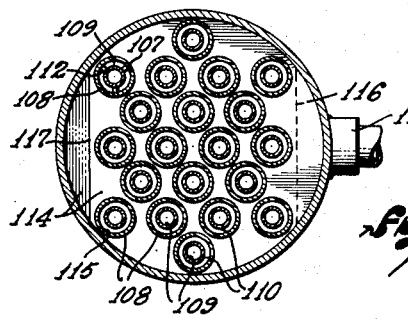
LEE ROY ERWIN &
JOSEPH B. GRIFFITH,
INVENTORS.
HUEBNER, BEEHLER, WORREL
HERZIG & CALDWELL,
ATTORNEYS.
BY Patented May 19, 1953

2,638,751

UNITED STATES PATENT OFFICE 2,638,751

WATER COOLER

Lee Roy Erwin, Monrovia, and Joseph B. Griffith, Pasadena, Calif., assignors to Affiliated Gas Equipment, Inc., Cleveland, Ohio, a corporation of Delaware Application April 17, 1950, Serial No. 156,332

8 Claims. (Cl. 62—3)

Our invention relates to a water cooler and has particular reference to the details of construction wherein water may be substantially instantaneously cooled, particularly where large volumes of refrigerated water are needed.

One of the objects of our invention is to produce a water cooling system, wherein water in substantially large volumes can be cooled during the course of travel through the cooler without the necessity of storage of water in tank while being cooled, and to cool such water to within a fraction of a degree of the temperature of the refrigerant being employed.

We have employed a flooded coil type refrigeration system, wherein circulation of a liquid refrigerant through the refrigerating system is caused by convection currents and whereby the heat transferred from the water to the refrigerant is greatly increased because of liquid-to-metal contact rather than the contact of gaseous refrigerant which is slower in heat transfer. We employ the term "flooded coil" in the description and claims in the generally accepted meaning to distinguish from a dry coil system, the word "coil" having no reference to the specific form of the tube or tubes through which the refrigerant travels. The "coil" illustrated in the present disclosure comprises a plurality of straight tubes.

The refrigeration system contemplated employs a tank for liquid refrigerant into which the flooded coils are attached and has means for controlling the level of liquid refrigerant in said tank, which said means is responsive to the temperature of the water being introduced into the cooling system so that in the event the water is initially introduced at a higher temperature, greater amounts of liquid refrigerants are introduced into the system, to thereby compensate for the increased load or heat which must be removed.

Other and further objects and advantages will become apparent from the drawings and specifications relative thereto.

In the drawings:

Figure 3 is a sectional view taken on line 3—3 of Figure 2.

Figure 4 is a sectional view taken on line 4—4 of Figure 2.

Figure 5 is an enlarged fragmentary sectional view taken on line 5—5 of Figure 4.

Figure 6 is a sectional view taken on line 6—6 of Figure 2.

Figure 7 is a sectional view taken on line 7—7 of Figure 2.

Figure 8 is a sectional elevation of a modified form of heat exchanger.

Figure 9 is a sectional view taken on line 9—9 of Figure 8.

Figure 10 is a fragmentary sectional elevation of a further modification of a heat exchanger.

Figure 11 is a sectional view taken on line 11—11 of Figure 10.

Figure 1:
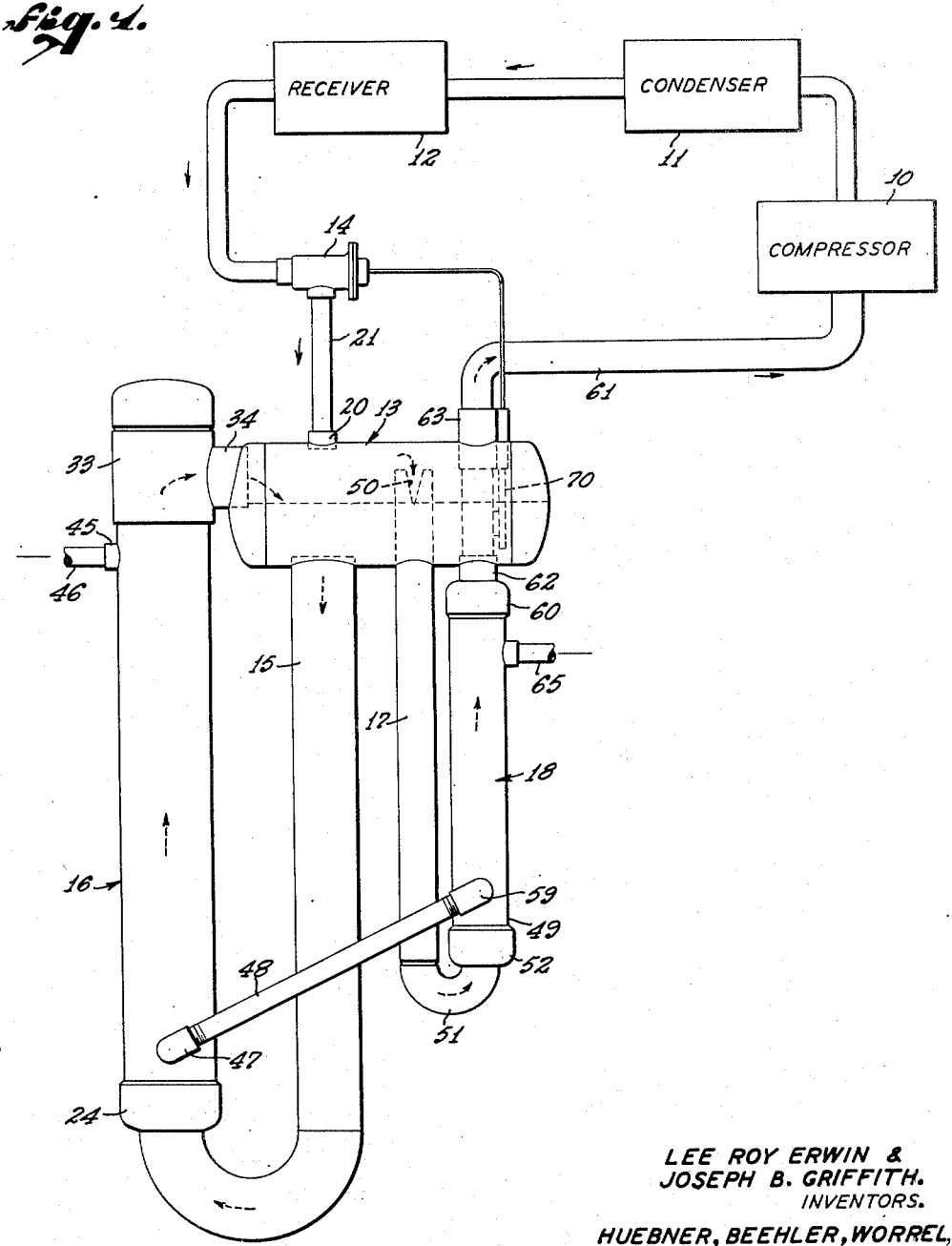
Figure 1 is an elevational view of a water cooler embodying the principles of our invention and being partially schematic insofar as the refrigeration system is concerned.

The preferred form of our invention includes a system having a compressor 10, a condenser 11, a receiver 12, and liquid refrigerant tank or header 13. An expansion valve 14 is interposed between the receiver 12 and the liquid refrigerant tank or header 13 and is adapted to control the admission of liquid refrigerant from the receiver into the header 13. The header 13 is formed with a depending cylindrical leg 15, connected at the lower end to a heat-exchange unit designated generally 16, which said heat exchange unit is adapted to pass refrigerant back into the header 13. The header 13 also has a second depending leg 17, which passes through a second heat-exchange unit 18 and upwardly to the compressor to return the spent or warmed refrigerant back to the compressor for completion of another cycle.

The compressor, condenser and receiver form no part of the invention and are shown schematically in order to orient our invention and to show a complete refrigerating system.

Figure 2:
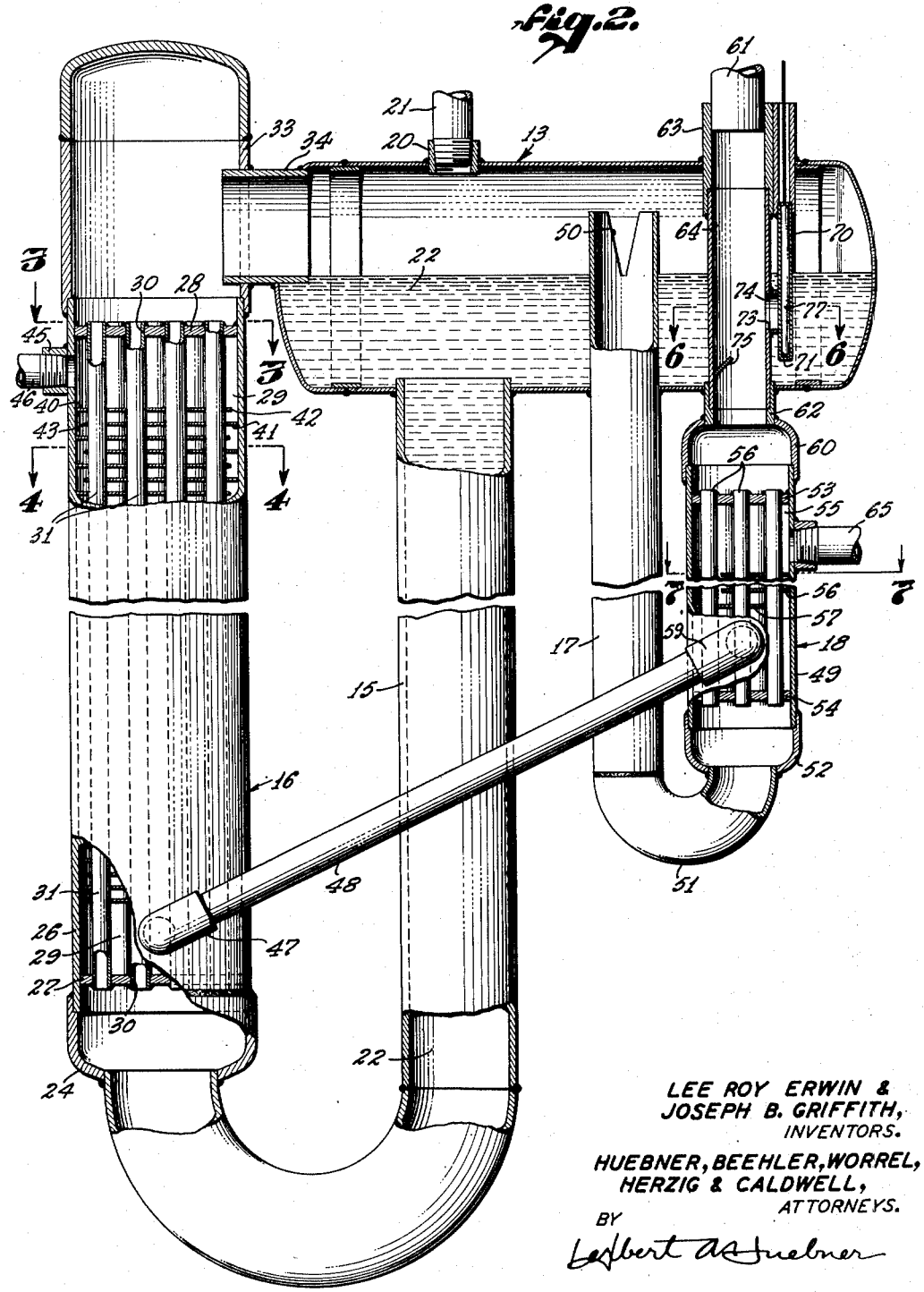
Figure 2 is an elevational view, partly in section, of the water cooler shown in Figure 1.

The essential details of our preferred form are shown more clearly in Figure 2.

The header 13 is formed with an inlet nipple 20, to which a conduit 21 is connected and leads to the expansion valve 14. Liquid refrigerant such as 22 is introduced through the pipe 21 into the header 13.

The header 13 is formed with an opening at the bottom thereof adapted to permit the cylindrical column 15 to be inserted therein in fluid-tight relation and to permit communication of the liquid refrigerant 22 downwardly through said cylindrical leg to the lower portion thereof, which is substantially U-shaped and terminates in a bell housing 24.

The heat-exchange unit 16 rests on top of the bell housing 24 and comprises a cylindrical housing 26 having tube sheets 27 and 28 at the lower and upper ends thereof, thereby defining a closed chamber 29, through which water being cooled is circulated.

Each of the tube sheets 27 and 28 is formed with a plurality of apertures such as 30, through which tubes 31 are extended, thereby creating a plurality of communicating conduits between the bell housing 24 and the upper end of the heat-exchange unit 16 for the passage of refrigerant.

The heat-exchange unit 16 also has an upper housing 33, the interior of which is in communication with the interior of the header 13 by means of a nipple 34, communicating with the interior of the header 13 at a point above the normal level of the liquid refrigerant 22.

A plurality of baffles such as 40 and 41 are alternately disposed in the housing 26 in spaced relation. Each of the baffles is formed with a plurality of apertures corresponding with the apertures 30, so that the tubes 31 can pass therethrough.

Each of the baffles 40 and 41 conforms substantially to the inner surface of the cylindrical housing 26 except at one edge thereof, wherein it is spaced therefrom, thereby defining passages 42 and 43 alternately disposed on opposite sides of the cylindrical housing 26. It is obvious therefore, that a tortuous path is defined beween each successive baffle and through the alternately, oppositely spaced passages between the baffles and the cylindrical housing 26.

The cylindrical housing 26 is formed with a boss 45 adapted to receive a discharge nipple 46 in communication with the interior of the heat-exchange unit.

A nipple 47 is adapted to connect a supply pipe 48 into the lower region of the heat exchange unit 16 so that water introduced through the pipe 48 passes into the chamber 29 and moves upwardly through the above mentioned tortuous path. Such a construction results in a high degree of turbulence in the water and an intimate contact of all parts of the water with the walls of the tubes 31, which carry liquid refrigerant, so that by the time the water has reached the discharge nipple 46 it is cooled to substantially the same temperature as the liquid refrigerant contained in the tubes.

The second depending column 17 extends inwardly into the header 13 and terminates at a point above the normal level of the liquid refrigerant 22. The upper end of the column 17 is open and formed with a notch 50. The column 17 terminates at the lower end in a U-shaped section 51, having a bell housing 52 disposed thereon and connecting said column 17 with the heat exchanger 18.

The heat exchanger 18 comprises a cylindrical housing 49 having tube sheets 53 and 54 at the upper and lower ends thereof, respectively, defining thereby a chamber 55. A plurality of tubes 56 extends through the diaphragms 53 and 54 in a similar manner as the tubes 31 in the heat exchanger 16.

The heat exchanger 18 is also provided with a plurality of baffles 56 and 57 in spaced parallel relation having opposite ends cut off to thereby define a tortuous path upwardly through said baffles and around said tubes 56 in a manner similar to the heat exchanger 16 previously described.

A water inlet conduit 65 is connected to the interior chamber 55 of the heat-exchanger unit 18. The water supply pipe 48 is connected into the chamber 55 by means of a nipple 59.

The heat exchanger 18 is capped by a bell housing 60 which is connected to a suction line 61 returning spent refrigerant gas to the compressor 10 by means of nipples 62 and 63 and conduit 64. The conduit 64 runs through the header 13 and is surrounded by liquid refrigerant in the lower region thereof and by gaseous refrigerant in the upper region thereof.

A tube 70 having a closed bottom 71 is secured to the nipple 63 and depends into the liquid refrigerant 22 in spaced relation with respect to the conduit 64.

The conduit 64 is formed with an aperture 73 surrounded by a wall 74 so that gaseous refrigerant in the conduit 64 is communicated directly against the tube 70. A baffle 75 is disposed inside the conduit 64 to direct exhaust gases into the pocket defined by the aperture 73 and the walls 74.

A remote pressure bulb 77 is disposed into the tube 70 so that a portion of the bulb is responsive to the temperature of the liquid refrigerant 22, and a portion thereof is responsive to super heated gases in the conduit 64. For further details of the construction and operation of this liquid level control, reference is made to the copending application of Lee Roy Erwin and Joseph B. Griffith, filed May 9, 1949, being Serial No. 92,102, for Control for Refrigeration System.

Liquid refrigerant is introduced into the header 13 and fills the cylindrical column 15 and the tubes 31. In view of the fact that the tubes 31 absorb heat at a much higher ratio than the column 15, the refrigerant in the tubes will become gasified and pass upwardly, thereby causing a flow of refrigerant downwardly through the column 15 and a continuous circulation. Gasified refrigerant is returned into the header 13, whence it passes into the vertical column 17 downwardly and up through the heat exchange 18.

The gases passing through the tube 17 into the heat-exchange unit 18 become superheated and are deflected in their upper travel by the baffle 75 against the wall of the tube 70 so that in the event that a large load is placed on the heat-exchange unit the temperature of the temperature-responsive bulb 77 will cause an opening of the expansion valve 14 to permit the introduction of more liquid refrigerant into the system.

In the event that too much liquid refrigerant is introduced into the system, it will flow over through the notch 50, thereby tending to cool or lower the temperature of the superheated gases in the conduit 64 and hence the gases impinging against the wall of the tube 70. This will lower the temperature in the control bulb 77 and close the expansion valve.

Due to the relatively large surface area created by dividing the liquid refrigerant into a large number of small tubes such as 31, large amounts of heat will be rapidly absorbed, thereby causing rapid gasification of the liquid refrigerant and a high velocity flow through the tubes 31. The high velocity flow tends to scour the walls thereof of any gas bubbles forming thereon, which increases the efficiency of the heat transfer. Movement of the refrigerant in the column 15 is both downwardly and slow so that gas bubbles may form on the inner wall thereof to act as an insulator and protect the column of liquid refrigerant contained therein, thereby further aiding in the circulation of refrigerant through the system because of the increased relative weight of the liquid refrigerant in the column 15 over the weight of the refrigerant in the tubes 31.

It will be understood that the water supply pipe 48 can be connected to the top of the heat-exchange unit, as well as the bottom, and the circulation of water therein reversed.

In Figure 8 we illustrate a modification of our water cooler. In this modification all parts bearing similar numerals are similar to those parts illustrated in Figures 1 to 7, inclusive, and heretofore described. The principal difference lies in the construction of the primary heat-exchange unit. In this modification we have provided a header 13a, adapted to receive liquid refrigerant 22.

The primary refrigerating system comprises a depending cylinder 80 being open at both ends, adapted to communicate the liquid refrigerant 22 to the bottom thereof. A cylindrical shell 81 is disposed in spaced concentric relation with respect to the cylinder 80 and is formed with a reduced lower end 82 secured to the wall of the cylinder 80 by any suitable means such as welding. The cylinder 80 is formed with a plurality of apertures 83 permitting communication of the liquid refrigerant from said cylinder into the annular chamber defined between the cylinder 80 and the shell 81. The annular chamber 83 is open at the top and in communication with the header 13a so that liquid refrigerant passing downwardly through the cylinder 80 can pass outwardly through the apertures 83a into the annular chamber 84 and hence upwardly into the header.

A third cylindrical member 85, defining a water jacket, is concentrically disposed about the shell 81 and spaced therefrom. An annular tube sheet 86 is secured between the water jacket 85 and the cylinder 80 at both top and bottom, and a plurality of tubes 87 extend through said baffle.

A cap 88 is disposed over the lower end of the water jacket 85, thereby defining a manifold chamber 89. The tubes 87 form a plurality of communicating paths for liquid refrigerant between the manifold chamber 89 and the interior of the header 13a and terminate at a point at least above the normal level of the liquid refrigerant 22.

A plurality of baffles such as 90 and 91 are disposed in spaced relation having alternate ends terminating in spaced relation from the interior wall of the water jacket 85 to thereby define a tortuous path between the lower end of the water compartment 97 and the upper end thereof. Water is introduced into the water compartment 97 by means of an inlet pipe 92 and discharged therefrom by a discharge pipe 93.

Liquid refrigerant is introduced into the header 13a and fills the interior of the cylinder 80. Some of the refrigerant fills the annular chamber 84 through the apertures 83a which absorbs heat through the shell 81 from the water in the water chamber 97. As heat is absorbed, the refrigerant becomes gasified and rises to the top, thereby carrying the heat with it and effectively insulating the column of refrigerant in the cylinder 80. Therefore, refrigerant will flow down through the column 80 and upwardly into the tubes 87.

Each of the tubes 87 is substantially smaller in diameter than the diameter of the cylinder 80, thereby exposing substantially more surface for heat absorption from the water in the chamber 97 to cause expansion and gasification of the liquid refrigerant. There is therefore a continuous flow of liquid refrigerant downwardly through the cylinder 80 and upwardly through the tubes 87.

Water being introduced through the pipe 92 follows a tortuous path upwardly around alternate ends of the baffles which causes a high degree of turbulence and intimate contact with the refrigerating tubes 87 so that by the time the water is ready to be discharged through the conduit 93, the temperature thereof has reached substantially the same level as the temperature of the liquid refrigerant.

A still further modification of an instantaneous water cooler embodying the principles of our invention, is illustrated in Figures 10 and 11. In this modification we have provided the usual header tank designated 13b, having a liquid refrigerant inlet pipe 21b. The tank 13b is adapted to receive liquid refrigerant 22, and is formed with a relatively large aperture 100 adjacent the bottom thereof, which said aperture receives in fluid-tight engagement the upper end of a cylindrical housing 101. The cylindrical housing 101 is secured to the tank 13b by any suitable means such as welding 102. The lower end of the tank 101 is enclosed by means of a cap 103 and is provided with tube sheets 104 and 105 at the bottom and top, respectively. A manifold chamber 106 is defined at the lower end of the tank and cap assembly by the cap 103 and the diaphragm 104.

Each of the tube sheets 104 and 105 is formed with a plurality of apertures 107 in axial alignment with a corresponding aperture in the other diaphragm having tubular members 108 fitted therein in fluid-tight relation, thereby providing a communication between the interior of the tank 13b and the manifold chamber 106.

A second tubular member 109 is disposed concentrically through each of the tubes 108 to thereby define an annular passage 110 through each of the tubes 108 from the manifold chamber into tank 13b.

The tubular members 109 are designed to communicate liquid refrigerant such as 22 downwardly from the tank 13b into the manifold chamber 106 from which it passes upwardly through the annular chamber 110 back into the interior of the tank 13b.

In Figure 11 we have illustrated means for supporting the tubes 109 in the tubes 108 as a spider 112 which may be positioned either singly or in multiple at any desired location along the tube 109. Whereas we have shown only one such spider, it should be understood that all of the tubes 109 will be so supported in the tubes 108.

A plurality of horizontally disposed baffles 114 are disposed in the cylindrical tank 101 and are formed with apertures 115 to permit passage of tubes 108.

Each of the baffles 114 are formed in plan view to correspond with the interior surface of the cylinder 101 as shown in Figure 11, except that alternate ends such as 116 and 117 are spaced from the interior surface of the tank 101 so that a tortuous path is defined upwardly through the tank and in between each of the tubes 108.

The cylindrical tank 101 is also provided with an inlet 118 and an outlet 119 spaced above and below the tube sheets 104 and 105, respectively, so that water may be introduced at 118, pass upwardly through the tortuous path defined by the baffles 114 and be discharged through the outlet 119. It will be readily apparent that the water so passing through the heat-exchange unit, will be turbulent and in intimate contact with the exterior surface of the tubes 108. Therefore, heat exchange between the water contained inside the cylinder 101 and the tubes 108 will be at a maximum.

Liquid refrigerant 22 contained in the tank 13b will pass downwardly through the tubes 109 into the chamber 106, and because of the heat exchange between the tubes 108 and the water contained in the cylinder 101, liquid refrigerant which also fills the annular chamber 110, will absorb heat, vaporize and readily pass upwardly through the annular chamber 110. The differential in hydrostatic pressure between the column of liquid refrigerant in the tubes 109 and the liquid refrigerant in the annular passage 110, will cause a continuous circulation of refrigerant downwardly through the tubes 109 and upwardly through the annular chamber 110.

Whereas the other parts of the water cooling system are not illustrated in Figures 10 and 11, it will readily be understood that such will be employed, such as the overflow pipes 17 leading to the heat-exchange unit 18, the suction line 61 and back to the compressor and condenser circuit.

While we have herein shown and described our invention in what we have conceived to be the most practical and preferred embodiment, it is recognized that departures may be made therefrom within the scope of our invention, which is not to be limited to the details disclosed herein, but is to be accorded the full scope of the claims so as to embrace any and all equivalent devices.

Having described our invention, what we claim as new and desire to secure by Letters Patent is:

1. A water cooler comprising a flooded coil refrigerating system, and a heat exchange unit, said flooded coil system having a header tank for the reception of liquid refrigerant, an expansion loop depending from said header tank and in communication with the interior thereof and having a cylindrical depending leg and a coaxial return leg defining an annular passage for the return of refrigerant into said header tank, said heat exchange unit having a cylindrical shell surrounding said expansion loop and a plurality of baffles disposed in spaced horizontal relation therein through which said expansion loop passes, each of said baffles being in substantially complete circumferential abutment against the inner surface of said shell and having one edge thereof in spaced relation from said shell defining a passage, the passage of each contiguous baffle being on diametrically opposed sides, and inlet and discharge passages communicating with the interior of said shell, whereby water entering said inlet follows a tortuous, turbulent path in intimate contact with said refrigerant loop to be cooled thereby.

2. A water cooler comprising a flooded coil refrigerating system, and a heat exchange unit, said flooded coil system having a header tank for the reception of liquid refrigerant, a plurality of expansion loops depending from said header tank and in communication with the interior thereof, each said loop comprising a vertically disposed inner tube in communication with the interior of said header tank and a coaxial outer tube disposed around said inner tube defining an annular passage for the return of refrigerant to said header tank, said heat exchange unit having a cylindrical shell surrounding said expansion loops and a plurality of baffles disposed in spaced horizontal relation therein through which each of said loops passes, each of said baffles being in substantially complete circumferential abutment against the inner surface of said shell and having one edge thereof in spaced relation from said shell defining a passage therebetween, the passage of each contiguous baffle being on diametrically opposed sides, and inlet and discharge passages communicating with the interior of said shell, whereby water entering said inlet follows a tortuous, turbulent path in intimate contact with said refrigerant loop return tube to be cooled thereby.

3. A water cooler comprising a refrigerating system having a compressor, a condenser, a receiver, an expansion valve adapted to control the flow of liquid refrigerant from said receiver, a header tank to receive liquid refrigerant from said expansion valve, and a refrigerating loop in communication with the interior of said header having a depending leg of relatively large diameter and a return leg of relatively small diameter, whereby a circulation of refrigerant is caused to flow through said loop, a first heat exchange unit comprising a cylindrical housing having a plurality of horizontally spaced baffles, alternate baffles of which have opposite edges spaced from the inner surface of said shell to thereby define a tortuous passage through said shell, said return leg being positioned to pass through each of said baffles and being continuously in said tortuous passage, control means for regulating the level of refrigerant in said tank comprising a conduit loop having one end in communication with the interior of said tank and the other end passing therethrough and in communication with said compressor and temperature responsive pressure bulb in heat-exchanging relation with gases in said other end and liquid refrigerant in said header tank and means for communicating the pressure in said bulb to said expansion valve, a second heat exchange unit to precool water before entering said first heat exchange unit and comprising a shell disposed surrounding said leg in communication with said compressor and having a tortuous path therein, and means connecting said precool heat exchange unit with said first mentioned heat exchange unit.

4. A water cooler comprising a refrigerating system having a compressor, a condenser, a receiver, an expansion valve adapted to control the flow of liquid refrigerated from said receiver, a header tank to receive liquid refrigerant from said expansion valve, a refrigerating loop having two ends in open communication with the interior of said header and having a depending leg of relatively small surface area compared to its volume and a plurality of return legs having relatively large surface compared to their total volume, whereby a circulation of refrigerant is caused to flow through said loop, a first heat exchange unit comprising a cylindrical housing having a plurality of horizontally spaced baffles, alternate baffles of which have opposite edges spaced from the inner surface of said shell to thereby define a tortuous passage through said shell, said return leg being positioned to pass through each of said baffles and being continuously in said tortuous passage, control means for regulating the level of refrigerant in said tank comprising a conduit loop having one end in communication with the interior of said tank and the other end passing therethrough and in communication with said compressor and temperature responsive pressure bulb in heat-exchanging relation with gases in said other end and liquid refrigerant in said header tank and means for communicating the pressure in said bulb to said expansion valve, a second heat exchange unit to precool water before entering said first heat exchange unit and comprising a shell disposed surrounding said leg in communication with said compressor and having a tortuous path therein, and means connecting said precool heat exchange unit with said first mentioned heat exchange unit.

5. A water cooler comprising a refrigerating system having a compressor, a condenser, a receiver, and an expansion valve adapted to control the flow of liquid refrigerant from said receiver, a header tank to receive liquid refrigerant from said expansion valve, a refrigerating loop having its ends in open communication with the interior of said header and comprising a depending leg of relatively large diameter and a plurality of return legs each of relatively small diameter, whereby a circulation of refrigerant is caused to flow through said loop, a heat exchange unit comprising a cylindrical housing having a plurality of horizontally spaced baffles, alternate baffles of which have opposite edges spaced from the inner surface of said shell to thereby define a tortuous passage through said shell, said return leg being positioned to pass through each of said baffles and being continuously in said tortuous passage, control means for regulating the level of refrigerant in said tank comprising a conduit loop having one end in communication with the interior of said tank and the other end passing therethrough and in communication with said compressor and temperature responsive pressure bulb in heat exchanging relation with gases in said other end and liquid refrigerant in said header tank and means for communicating the pressure in said bulb to said expansion valve, a second heat exchange unit to precool water before entering said first heat exchange unit and comprising a shell disposed surrounding said leg in communication with said compressor and having a tortuous path therein, and means connecting said precool heat exchange unit with said first mentioned precool unit.

6. Refrigerating apparatus comprising in combination a header tank, means to admit liquid refrigerant to said tank, a first expansion loop depending from said header tank, both ends of said first loop communicating with the interior of said tank whereby refrigerant flows down one leg of said first loop and up the other leg, the upflow leg of said first loop including a heat exchanger effective to transfer heat from material to be cooled to refrigerant in said first loop, whereby liquid refrigerant is vaporized in said upflow leg and returns to said tank in vapor form, an outlet expansion loop depending from said tank having a downflow leg communicating with the interior of said tank substantially above the bottom thereof, and having an upflow leg adapted to be connected to a refrigerant compressor, whereby said outlet loop normally receives only vaporized refrigerant from said tank, and receives liquid refrigerant only when the liquid level in the tank rises above the inlet of said outlet loop, the upflow leg of said outlet loop including a heat exchanger adapted to extract heat from material to be cooled, a temperature sensitive element in thermal association with the upflow leg of said outlet loop, and means responsive to said temperature sensitive element to control admission of liquid refrigerant to said header tank in accordance with the temperature of said element.

7. In refrigerating apparatus, the combination of a header tank, means for admitting liquid refrigerant into said tank, a first expansion loop depending from said tank, each end of said loop communicating with the interior of said tank, said first loop having a downflow leg and an upflow leg including a heat exchanger adapted to transmit heat from material to be cooled to refrigerant in said first loop, whereby liquid refrigerant flows from said tank into said first loop, is vaporized in the upflow leg thereof, and returns in vapor form to said tank, and an outlet expansion loop depending from said header tank and having a downflow leg communicating with the interior of said tank above the bottom thereof, and an upflow leg adapted to be connected to a refrigerant compressor, whereby said outlet loop normally receives only vaporized refrigerant, and liquid refrigerant flows thereinto only when the liquid level in said tank rises above the inlet to said outlet loop, the upflow leg of said outlet loop including a heat exchanger adapted to convey heat to refrigerant in said outlet loop from material to be cooled.

8. In combination in refrigerating apparatus, a header tank adapted to receive liquid refrigerant, an inlet for admitting liquid refrigerant to said tank, an outlet expansion loop depending from said header tank and having a downflow leg in communication with the interior of said tank above the bottom thereof, and an upflow leg adapted to communicate with a vapor compressor, said upflow leg including a heat exchanger adapted to transfer heat from material to be cooled to refrigerant in said upflow leg, said outlet loop normally evacuating vaporized refrigerant from said tank but receiving liquid refrigerant when the liquid level in said tank rises above the inlet of said outlet loop, a temperature sensitive element in thermal association with the upflow leg of said outlet loop, and means responsive to said temperature sensitive element to control admission of liquid refrigerant into said header tank in accordance with the temperature in said loop.

LEE ROY ERWIN.
JOSEPH B. GRIFFITH.

References Cited in the file of this patent

UNITED STATES PATENTS

| Number | Name | Date |
|---|---|---|
| 1,694,369 | Burdick | Dec. 11, 1928 |
| 1,829,865 | Kleucker | Nov. 3, 1931 |
| 1,923,170 | Slagel | Aug. 22, 1933 |
| 1,974,736 | Candor | Sept. 25, 1934 |
| 2,434,374 | Tull | Jan. 13, 1948 |
| 2,478,863 | Davis | Aug. 9, 1949 |
| 2,572,501 | Matteson | Oct. 23, 1951 |